(12) United States Patent  
Syu

(10) Patent No.: US 8,700,950 B1
(45) Date of Patent: Apr. 15, 2014

(54) SYSTEM AND METHOD FOR DATA ERROR RECOVERY IN A SOLID STATE SUBSYSTEM

(75) Inventor: Mei-Man L. Syu, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 432 days.

(21) Appl. No.: 13/025,980

(22) Filed: Feb. 11, 2011

(51) Int. Cl.
 *G06F 11/00* (2006.01)
(52) U.S. Cl.
 USPC ........... 714/6.24; 714/6.1; 714/6.2; 714/6.22; 714/42
(58) Field of Classification Search
 USPC ............ 714/6.1, 6.2, 6.21, 6.22, 6.24, 42, 48, 714/54
 See application file for complete search history.

(56) References Cited

U.S. PATENT DOCUMENTS

| | | | |
|---|---|---|---|
| 5,408,644 A | 4/1995 | Schneider et al. | |
| 5,499,337 A | 3/1996 | Gordon | |
| 6,467,022 B1 | 10/2002 | Buckland et al. | |
| 6,523,087 B2 | 2/2003 | Busser | |
| 6,959,413 B2 | 10/2005 | Humlicek et al. | |
| 7,069,382 B2 | 6/2006 | Horn et al. | |
| 7,200,715 B2 | 4/2007 | Kleiman et al. | |
| 7,409,492 B2 | 8/2008 | Tanaka et al. | |
| 7,640,390 B2 | 12/2009 | Iwamura et al. | |
| 7,653,778 B2 | 1/2010 | Merry, Jr. et al. | |
| 7,779,294 B2 * | 8/2010 | Corrado et al. | 714/6.22 |
| 7,856,528 B1 | 12/2010 | Frost et al. | |
| 8,321,597 B2 | 11/2012 | Yu et al. | |
| 8,402,217 B2 * | 3/2013 | Burd | 714/6.24 |

| | | |
|---|---|---|
| 2004/0015657 A1 | 1/2004 | Humlicek et al. |
| 2004/0123032 A1 | 6/2004 | Talagala et al. |
| 2005/0066124 A1 | 3/2005 | Horn et al. |
| 2005/0086429 A1 | 4/2005 | Chatterjee et al. |
| 2005/0177672 A1 | 8/2005 | Rao |
| 2006/0004957 A1 | 1/2006 | Hand, III et al. |
| 2006/0236029 A1 | 10/2006 | Corrado et al. |
| 2007/0268905 A1 | 11/2007 | Baker et al. |
| 2007/0283079 A1 | 12/2007 | Iwamura et al. |
| 2007/0294565 A1 | 12/2007 | Johnston et al. |
| 2007/0297265 A1 | 12/2007 | Kim et al. |
| 2008/0133969 A1 | 6/2008 | Manoj |
| 2008/0141054 A1 | 6/2008 | Danilak |
| 2008/0155160 A1 | 6/2008 | McDaniel |
| 2008/0229148 A1 | 9/2008 | Forhan et al. |
| 2008/0276124 A1 | 11/2008 | Hetzler et al. |
| 2009/0073762 A1 | 3/2009 | Lee et al. |
| 2009/0083504 A1 | 3/2009 | Belluomini et al. |

(Continued)

FOREIGN PATENT DOCUMENTS

WO   WO 2010049928 A1 *  5/2010

*Primary Examiner* — Joseph D Manoskey

(57) ABSTRACT

Systems and methods are disclosed for recovering from a data access error encountered in data stripes implemented in a data redundancy scheme (e.g., RAID) in a solid state storage device. In one embodiment, the storage device holds parity data in a temporary, volatile memory such as a RAM and writes the parity data to the non-volatile memory when a full stripe's worth of new write data has been written to the non-volatile memory. In one embodiment, upon detecting that a data access error has occurred in a partially written stripe, the storage device initiates a write of the parity data for the partially written stripe to the non-volatile memory and executes a RAID recovery procedure using the newly written parity data to attempt to recover from the detected error. This approach allows for a recovery from the data access error without waiting for the full stripe to be written.

15 Claims, 3 Drawing Sheets

(56) References Cited

U.S. PATENT DOCUMENTS

| | | |
|---|---|---|
| 2009/0150599 A1 | 6/2009 | Bennett |
| 2009/0172335 A1 | 7/2009 | Kulkarni et al. |
| 2009/0204852 A1 | 8/2009 | Diggs et al. |
| 2009/0210744 A1 | 8/2009 | Kamalavannan |
| 2009/0248998 A1 | 10/2009 | Sato et al. |
| 2009/0327604 A1 | 12/2009 | Sato et al. |
| 2009/0327803 A1 | 12/2009 | Fukutomi et al. |
| 2010/0049914 A1 | 2/2010 | Goodwin |
| 2010/0064111 A1 | 3/2010 | Kunimatsu et al. |
| 2010/0088557 A1 | 4/2010 | Weingarten et al. |
| 2010/0088579 A1 | 4/2010 | Hafner et al. |
| 2010/0115175 A9 | 5/2010 | Zhuang et al. |
| 2010/0122115 A1 | 5/2010 | Olster |
| 2010/0169543 A1 | 7/2010 | Edgington et al. |
| 2010/0262773 A1 | 10/2010 | Borchers et al. |
| 2010/0281202 A1 | 11/2010 | Abali et al. |
| 2011/0035548 A1 | 2/2011 | Kimmel et al. |
| 2011/0126045 A1 | 5/2011 | Bennett |
| 2011/0173484 A1 | 7/2011 | Schuette et al. |
| 2011/0191649 A1 | 8/2011 | Lim et al. |
| 2011/0219259 A1 | 9/2011 | Frost et al. |
| 2011/0264843 A1 | 10/2011 | Haines et al. |
| 2011/0314218 A1 | 12/2011 | Bert |
| 2012/0079318 A1 | 3/2012 | Colgrove et al. |
| 2012/0110376 A1 | 5/2012 | Dreifus et al. |
| 2012/0151253 A1* | 6/2012 | Horn .......................... 714/6.22 |
| 2012/0173790 A1 | 7/2012 | Hetzler et al. |
| 2012/0233406 A1 | 9/2012 | Igashira et al. |
| 2012/0246403 A1 | 9/2012 | Mchale et al. |

* cited by examiner

SYSTEM AND METHOD FOR DATA ERROR RECOVERY IN A SOLID STATE SUBSYSTEM

BACKGROUND

Many data storage components such as hard disks and solid state drives have certain advertised reliability guarantees that the manufacturers provide to customers. For example, certain solid state drive manufacturers guarantee a drive failure rate of $10^{-16}$ or $10^{-17}$. To increase data reliability, a data redundancy scheme such as RAID (Redundant Arrays of Independent Disks) is used to increase storage reliability. The redundancy may be provided by combining multiple storage elements within the storage device into groups providing mirroring and/or error checking mechanisms. For example, various memory pages/blocks of a solid state storage device may be combined into data stripes in which user data is stored.

BRIEF DESCRIPTION OF THE DRAWINGS

Systems and methods which embody the various features of the invention will now be described with reference to the following drawings, in which.

DETAILED DESCRIPTION OF SPECIFIC EMBODIMENTS

Overview

A common approach to overcome storage element failure is to use redundant RAID (mirroring, parity, etc.) to allow data recovery should one or more failures (e.g., a read failure) occur. Typically, a target number of storage elements (e.g., pages, blocks, etc.) per stripe is chosen to achieve a desired reliability at a given cost in storage overhead. In a flash-based/solid-state storage system, parity data is usually held in a temporary volatile memory such as RAM (Random Access Memory) and such parity data for a stripe is typically written to the non-volatile flash media when the full stripe's worth of data has been written to the non-volatile flash media. However, there are situations when the yet-to-be written parity may be needed for data recovery.

Various embodiments of the invention determine when it is appropriate to force a write of the yet-to-be written parity data associated with a partial stripe. In one embodiment, upon the detection of a data access error (e.g., a read or program error) on data in the partial stripe, the system triggers a write of the parity data to the flash media and initiates a data recovery procedure using the newly written parity. This approach allows the system to recover from a data access error without having to wait for a full stripe of data to be written to the flash media.

System Overview

Figure 1:
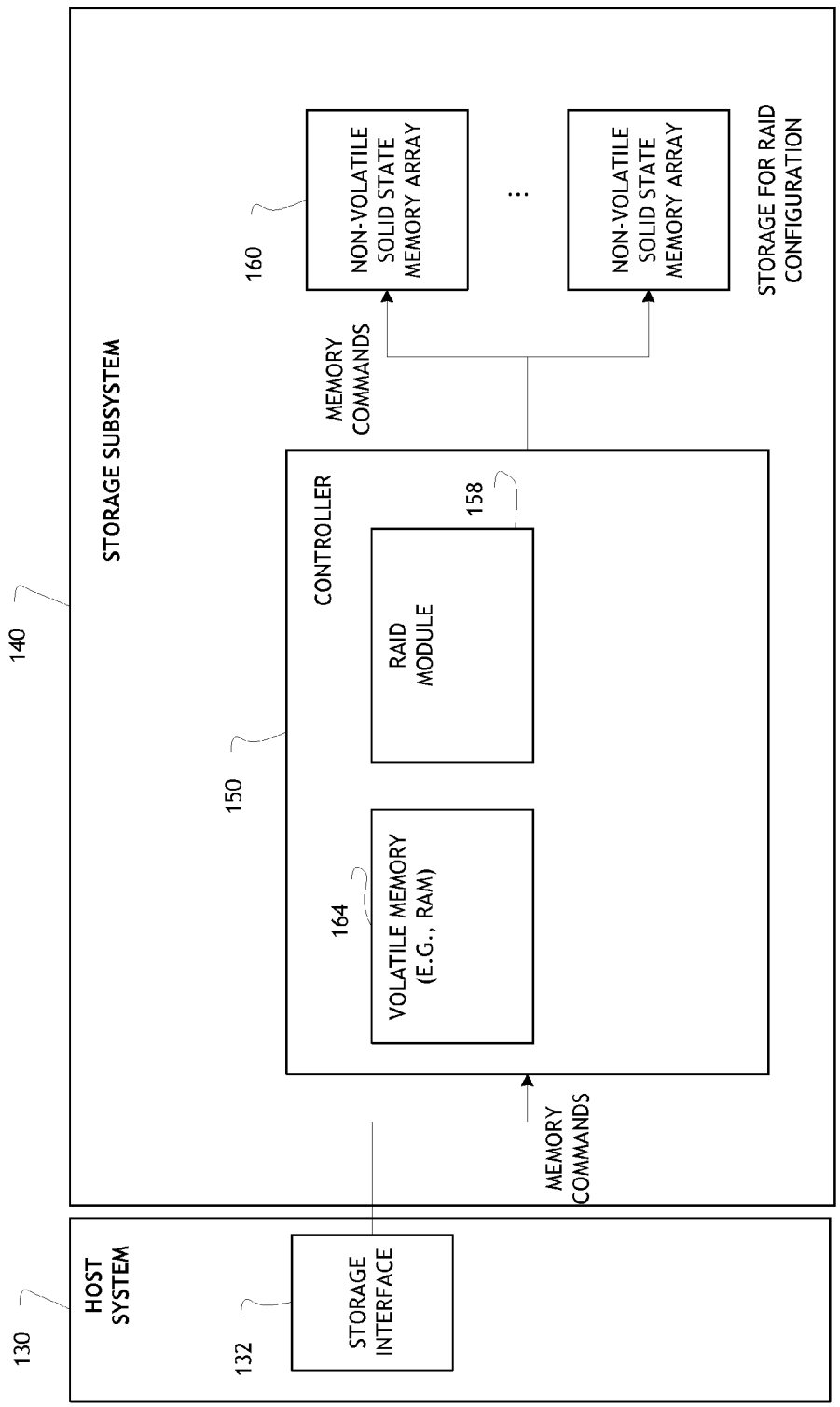
FIG. 1 is a block diagram illustrating a storage subsystem implementing a data redundancy scheme with a mechanism for utilizing redundancy data to recover from a data access error according to one embodiment.

FIG. 1 is a block diagram illustrating a storage subsystem implementing a data redundancy scheme with a mechanism for utilizing redundancy data to recover from a data access error according to one embodiment. As shown, a storage subsystem 140 includes a controller 150 and one or more non-volatile solid-state memory arrays 160. The arrays 160 may comprise a plurality of solid-state storage devices coupled to the controller 114. The arrays may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferro-electric Memory (FeRAM), or other discrete NVM chips. The solid-state storage devices may be physically divided into blocks, pages and sectors, as is known in the art. Other forms of storage (e.g., battery backed-up volatile DRAM or SRAM devices, magnetic disk drives, etc.) may additionally or alternatively be used.

The controller 150 in one embodiment in turn includes a RAID module 158 and a volatile memory 164, which may be implemented in, for example, RAM such as a DRAM or SRAM. The controller may alternatively be implemented in-whole or in-part as an ASIC, FPGA, or other device, which may but need not execute firmware. In another embodiment the volatile memory 164 is outside of the controller 150 in the storage subsystem 140. In one embodiment, the RAID module 158 is configured to execute data access commands to maintain a data redundancy scheme in the storage subsystem. For example, the RAID module 158 may maintain data on which storage elements are assigned to which RAID stripes and determine how data are arranged in the data redundancy scheme (e.g., grouped into stripes with parity).

In one embodiment, the controller 150 of the storage subsystem 140 is configured to receive and execute commands from a storage interface 132 in a host system 130. The memory commands from the storage interface 132 may include write and read commands issued by the host system 130. As further shown in FIG. 1, in one embodiment, the controller 150 executes the received commands in one or more non-volatile solid-state memory arrays 160. As will be explained below, in one embodiment, the volatile memory 164 is configured to temporarily hold parity data for data stripes (e.g., RAID stripes) that are yet to be completed/closed. When a stripe is complete (e.g., all pages of a stripe are programmed in the non-volatile memory arrays 160), the parity data is then transferred to the non-volatile memory arrays 160. The volatile memory 164 may also be configured to temporarily hold "user" data to be written to the memory arrays 160, and such user data may include data received from the host system 130 and/or other data related to internal storage subsystem operations such as garbage collection and wear leveling. In one embodiment, the user data may be held in a separate volatile memory than that which is used to hold the parity data, or in a different portion of the volatile memory 164 than that which is used for the parity data. The controller 150 may also execute internal memory commands such as those needed for garbage collection and wear leveling, etc. and write data related to those internal memory commands to the non-volatile solid-state memory arrays 160 (via the volatile memory or directly to the memory arrays).

Although this disclosure uses RAID as an example, the systems and methods described herein are not limited to the RAID redundancy schemes and can be used in any data redundancy configuration that utilizes striping and/or grouping of storage elements for mirroring or error checking purposes. In addition, although RAID is an acronym for Redundant Array of Independent Disks, those skilled in art will appreciate that RAID is not limited to storage devices with physical disks and is applicable to a wide variety of storage devices including the non-volatile solid state devices described herein.

Partial Parity Writing Process

Figure 2:
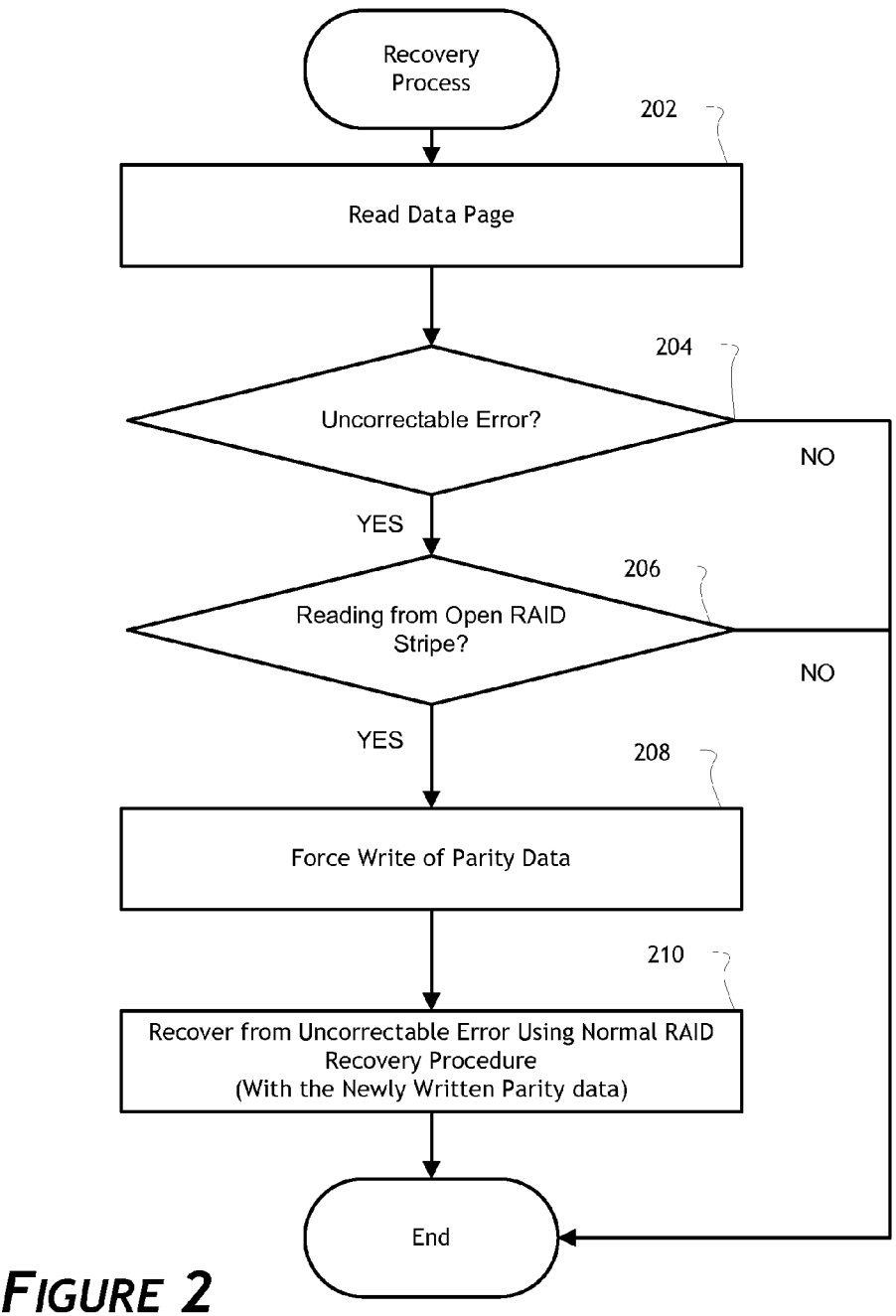
FIG. 2 is flow diagram showing a process of ensuring data reliability in the event of a data read error according to one embodiment.
Figure 3A:
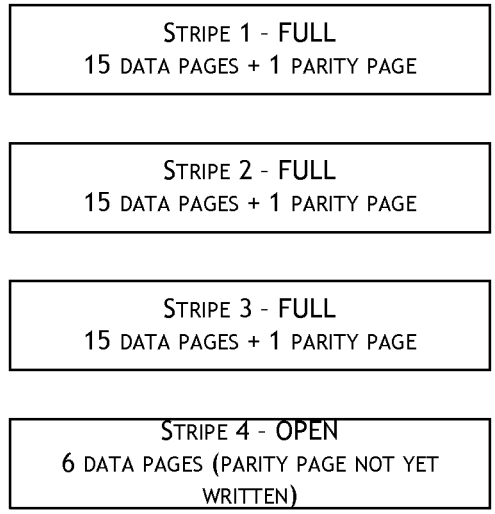
FIGS. 3A-3B illustrate an example of a partial data stripe that is written as a result of a data read error according to one embodiment.
Figure 3B:
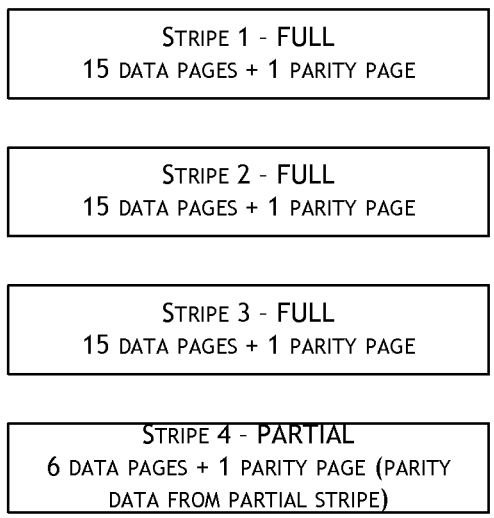

FIG. 2 is flow diagram showing a process of ensuring data reliability in the event of a data read error according to one embodiment. Although an ECC read error example is described here, the same process is applicable to a program error as well. In block 202, the controller 150 reads a data page in the non-volatile memory array. In block 204, it is determined whether an uncorrectable error (e.g., uncorrectable by ECC) has occurred as a result of the read operation. In one embodiment, the controller employs an ECC (error-correcting code) mechanism to attempt to correct any reading error, but if the ECC mechanism cannot recover the error, then the error is deemed uncorrectable. If the error is not uncorrectable, e.g., the error was corrected by ECC, then the process exits since the error condition no longer exists. However, if the error is uncorrectable, in block 206, the controller determines whether the read operation that triggered the error belongs to an open RAID stripe (i.e., a data stripe that has not been completely written to the non-volatile memory array and for which parity data has not been written to the non-volatile memory array). Since the writing of the parity data "closes" a stripe, a stripe prior to the writing of its parity data is said to be an "open" stripe. FIGS. 3A and 3B below will further illustrate the concept of an open RAID stripe. If it is determined that the read operation was for a page within an open RAID stripe, then in block 208 the controller will force a write of the parity data for the open RAID stripe. In one embodiment, this means that the parity data (for the open stripe) that is currently held in the volatile memory is written to the non-volatile memory array. With the parity data written, in block 210, the controller then attempts to recover the previously uncorrectable error using the RAID data recovery procedure (i.e., using the parity data that has just been written). Although FIG. 2 describes data as stored in units of pages, those skilled in the art will recognize that the process is applicable to systems with other memory measurement units such as blocks, sectors, etc.

Partial Stripe with Forced Parity Write Example

FIGS. 3A-3B illustrate an example of a partial data stripe that is written as a result of a data read error according to one embodiment. FIG. 3A shows four example stripes (Stripes 1-4). Stripes 1-3 are all full stripes in the sense that each has 15 data pages covered by one parity page. Stripes 1-3 have all been written to the non-volatile memory array. These three stripes represent stripes created under normal operation in which no uncorrectable (e.g., uncorrectable by ECC) data errors were detected in the process of stripe creation. In one embodiment, for these completed stripes with parity already written, any error not corrected by ECC can be corrected by using the normal RAID recovery procedure using the parity data. The fourth stripe, Stripe 4, is an open stripe, since it has only 6 pages written to the non-volatile memory array, and the parity data held in the volatile memory is not yet written to the non-volatile memory since parity is typically written after the 15th page is written to the non-volatile memory.

FIG. 3B shows the state of the non-volatile memory after the forced write of the parity data. The process shown in FIG. 3B may be performed in whole or in part by the controller shown in FIG. 1, or by a component of the controller such as the RAID module. As previously shown in FIG. 2, the forced write of parity data occurs when an uncorrectable data access error (e.g., uncorrectable by ECC) is encountered in one of the pages in an open stripe for which parity data has not been written to the non-volatile memory. In this example, the data error occurred while a read was being performed on one of the six pages in Stripe 4, prompting the writing of the parity data to the non-volatile memory ahead of its scheduled write time. The result, as shown in FIG. 3B, is that Stripe 4 is now a partial stripe within the non-volatile memory, and recovery from that uncorrectable data error proceeds with the partial parity data that was written. In one embodiment, after the storage subsystem recovers from that data access error through the use of parity data, the subsystem may move on to create other data stripes, leaving Stripe 4 as a partial stripe. In another embodiment, a partial stripe is re-opened and combined with additional new data to create a full stripe. The data in the partial stripe may be combined with newly received write data (whether from the host system or from other internal operations such as garbage collection or wear leveling), related data already in a volatile memory location in the storage subsystem, or filler data such as system data or pre-designated filler values such as zeros. Those skilled in the art will appreciate that in various embodiments, the actual steps taken in the process shown in FIG. 3B may differ from those shown in the figure. Depending on the embodiment, certain of the steps described in the example above may be removed, others may be added, and the sequence of steps may be altered and/or performed in parallel.

Conclusion

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. The features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A solid-state storage subsystem comprising:
a non-volatile memory array;
a controller configured to implement a data redundancy configuration with a plurality of data stripes in the non-volatile memory array; and
a volatile memory for temporarily storing data to be written to the non-volatile memory array and parity data for one or more of the data stripes in the non-volatile memory array, wherein each of the plurality of data stripes is of a pre-defined stripe size and wherein the controller is configured to write parity data for a data stripe to the non-volatile memory array when data already written to the non-volatile memory for the data stripe reaches the pre-defined stripe size;
wherein the controller is further configured to:

detect an occurrence of a data access error in one of the plurality of data stripes for which parity data has not been written to the non-volatile memory array; and in response to detecting an occurrence of a data access error, move the parity data for the data stripe causing the error from the volatile memory to the non-volatile memory array ahead of a scheduled writing of the parity data, and attempt to correct the data access error with the newly written parity data.

2. The solid-state storage subsystem of claim 1, wherein the writing of the parity data creates a partial data stripe that is smaller than the pre-defined stripe size.

3. The solid-state storage subsystem of claim 2, wherein the controller is further configured to combine the partial data stripe with additional data to create an expanded stripe of the pre-defined stripe size and write new parity data for the expanded stripe.

4. The solid-state storage subsystem of claim 1, wherein the data access error is an ECC read error.

5. The solid-state storage subsystem of claim 1, wherein the data access error is a program error.

6. The solid-state storage subsystem of claim 1, wherein the data redundancy configuration is a redundant array of independent disks (RAID) configuration.

7. A method of recovering from a data access error in a solid-state storage subsystem, the method comprising:

implementing a data redundancy configuration with a plurality of data stripes in a non-volatile memory array of the solid-state storage subsystem;

temporarily storing, in a volatile memory of the solid-state storage subsystem, data to be written to the non-volatile memory array and parity data associated with said data to be written;

detecting an occurrence of a data access error in one of the plurality of data stripes for which parity data has not been written to the non-volatile memory array; and in response to detecting the occurrence of a data access error, moving the parity data for said data stripe in which the data access error occurred from the volatile memory to the non-volatile memory array to make said parity data available for attempting to correct the data access error in advance of a scheduled write for the parity data, the scheduled write corresponding to a time when the data already written to the non-volatile memory for said data stripe reaches a pre-defined stripe size.

8. The method of claim 7, wherein each of the plurality of data stripes is of the pre-defined stripe size and wherein the writing of the parity data creates a partial data stripe that is smaller than the pre-defined stripe size.

9. The method of claim 7, further comprising:

combining the partial data stripe with additional data to create an expanded stripe of the pre-defined stripe size; and writing new parity data for the expanded stripe.

10. The method of claim 7, wherein the data access error is an ECC read error.

11. The method of claim 7, wherein the data redundancy configuration is a redundant array of independent disks (RAID) configuration.

12. A solid-state storage subsystem comprising:

a non-volatile memory array;

a controller configured to implement a data redundancy configuration with a plurality of data stripes in the non-volatile memory array; and volatile memory for temporarily storing data to be written to the non-volatile memory array and parity data for one or more of the data stripes in the non-volatile memory array;

wherein the controller is further configured to:

detect an occurrence of a data access error in one of the plurality of data stripes for which parity data has not been written to the non-volatile memory array; and in response to detecting an occurrence of a data access error, move the parity data for the data stripe in which the data access error occurred from the volatile memory to the non-volatile memory array, in advance of a time when the data written to the non-volatile memory for the data stripe reaches a pre-defined stripe size, whereby the data access error can be corrected with the parity data.

13. The solid-state storage subsystem of claim 12, wherein the data access error is an ECC read error.

14. The solid-state storage subsystem of claim 12, wherein the data access error is a program error.

15. The solid-state storage subsystem of claim 12, wherein the data redundancy configuration is a redundant array of independent disks (RAID) configuration.

* * * * *